(12) United States Patent
Sue et al.

(10) Patent No.: US 11,573,430 B2
(45) Date of Patent: Feb. 7, 2023

(54) OPTICAL UNIT WITH SHAKE CORRECTION FUNCTION

(71) Applicant: NIDEC SANKYO CORPORATION, Nagano (JP)

(72) Inventors: Takeshi Sue, Nagano (JP); Shogo Kasahara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/543,734

(22) Filed: Dec. 7, 2021

(65) Prior Publication Data

US 2022/0197049 A1 Jun. 23, 2022

(30) Foreign Application Priority Data

Dec. 17, 2020 (JP) .............................. JP2020-208881

(51) Int. Cl.
*G02B 27/64* (2006.01)
*H04N 5/225* (2006.01)

(52) U.S. Cl.
CPC ......... *G02B 27/646* (2013.01); *H04N 5/2253* (2013.01); *H04N 5/2254* (2013.01); *H04N 5/2257* (2013.01)

(58) Field of Classification Search
CPC .. G02B 27/646; H04N 5/2253; H04N 5/2254; G03B 5/02
See application file for complete search history.

(56) References Cited

U.S. PATENT DOCUMENTS

2006/0285837 A1* 12/2006 Mashima ........... H04N 5/23287
348/E5.046

FOREIGN PATENT DOCUMENTS

JP          2017207548          11/2017

* cited by examiner

*Primary Examiner* — Minh Q Phan
(74) *Attorney, Agent, or Firm* — JCIPRNET

(57) ABSTRACT

An optical unit with a shake correction function includes a reflection member reflecting light entering from the outside, a movable body turnably holding the reflection member, a fixed body turnably holding the movable body, a drive mechanism structured to turn the reflection member with respect to the movable body and turn the movable body with respect to the fixed body, and a turning axis part structuring a turning center of the movable body with respect to the fixed body. The movable body is capable of turning with respect to the fixed body with a first direction as an axial direction of turning, and the turning axis part includes a first ball disposed on one side of the movable body, a second ball disposed on the other side of the movable body and contacted with the fixed body, and an urging member which urges the first ball toward the second ball.

6 Claims, 7 Drawing Sheets

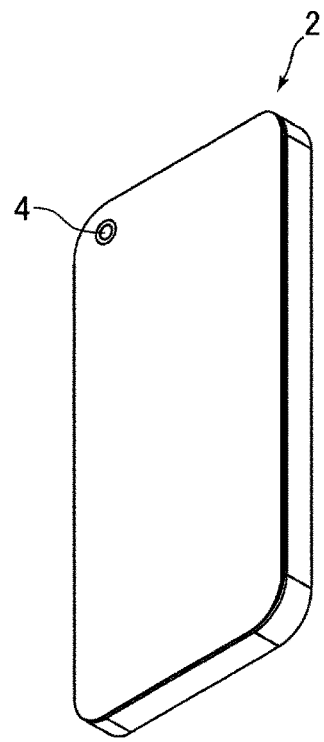
FIG. 6
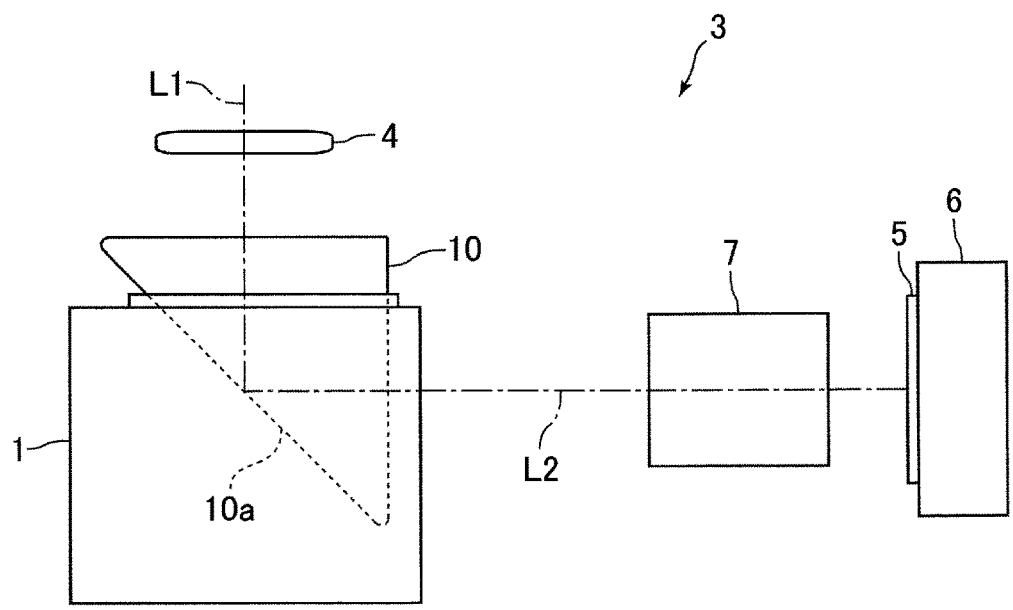
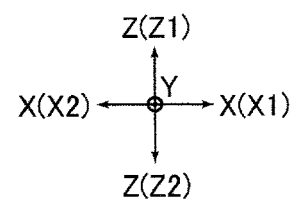
FIG. 7

OPTICAL UNIT WITH SHAKE CORRECTION FUNCTION

CROSS REFERENCE TO RELATED APPLICATION

The present invention claims priority under 35 U.S.C. § 119 to Japanese Application No. 2020-208881 filed Dec. 17, 2020, the entire content of which is incorporated herein by reference.

FIELD OF THE INVENTION

At least an embodiment of the present invention may relate to an optical unit with a shake correction function having a shake correction function for correcting an optical image shake.

BACKGROUND

Conventionally, an imaging device having a shake correction function has been known which is structured to swing an optical element and perform correction of an optical image shake (for example, Japanese Patent Laid-Open No. 2017-207548 (Patent Literature 1)). An imaging optical system of an imaging device described in Patent Literature 1 includes a front side lens group and a rear side lens group. The front side lens group is composed of a prism on which a reflection surface of light is formed, a first lens which is disposed on a light incident surface side of the prism, and a second lens disposed on a light emission surface side of the prism. In the imaging device described in Patent Literature 1, an optical image shake is corrected by swinging the first lens.

The present inventors have been examining that, in an optical unit with a shake correction function including a reflection member such as a prism formed with a reflection surface on which light entering from the outside is reflected toward an imaging element or the like, the reflection member is turned for correcting an optical image shake. The optical unit with a shake correction function includes a movable body which turnably holds a reflection member, a fixed body which turnably holds a movable body, and a drive mechanism structured to turn the reflection member with respect to the movable body and turn the movable body with respect to the fixed body. An axial direction of turning of the reflection member with respect to the movable body and an axial direction of turning of the movable body with respect to the fixed body are, for example, perpendicular to each other.

Further, the present inventors have been examining that, in the optical unit with a shake correction function, the movable body is turned with respect to the fixed body with a support shaft in a columnar shape which is supported by the fixed body as a turning center. In this case, a shaft passing hole through which the support shaft is passed is formed in the movable body. However, in this case, when a gap space is formed between an outer peripheral face of the support shaft and an inner peripheral face of the shaft passing hole (in other words, when a gap space is formed between the support shaft and the shaft passing hole in a radial direction of the support shaft), the movable bod is inclined with respect to the support shaft and, as a result, the movable body may be inclined with respect to the fixed body.

SUMMARY

In view of the problem described above, at least an embodiment of the present invention may advantageously provide an optical unit with a shake correction function including a reflection member formed with a reflection surface which reflects light entering from the outside, a movable body which turnably holds the reflection member, and a fixed body which turnably holds the movable body, the optical unit being capable of preventing an inclination of the movable body with respect to the fixed body.

According to at least an embodiment of the present invention, there may be provided an optical unit with a shake correction function including a reflection member formed with a reflection surface which reflects light entering from the outside, a movable body which turnably holds the reflection member, a fixed body which turnably holds the movable body, a drive mechanism structured to turn the reflection member with respect to the movable body and turn the movable body with respect to the fixed body, and a turning axis part which structures a turning center of the movable body with respect to the fixed body. The movable body is capable of turning with respect to the fixed body with a first direction previously determined as an axial direction of turning, and the turning axis part includes a first ball in a spherical shape which is disposed on one side of the movable body in the first direction, a second ball in a spherical shape which is disposed on the other side of the movable body in the first direction and is contacted with the fixed body, and an urging member which urges the first ball toward the second ball.

In the optical unit with a shake correction function in accordance with at least an embodiment of the present invention, a turning axis part which structures a turning center of the movable body with respect to the fixed body includes a first ball in a spherical shape which is disposed on one side of the movable body in the first direction, a second ball in a spherical shape which is disposed on the other side of the movable body in the first direction and is contacted with the fixed body, and an urging member which urges the first ball toward the second ball. Therefore, according to the present invention, the above-mentioned problem that a gap space is formed between a support shaft and a shaft passing hole in a radial direction of the support shaft does not occur. Accordingly, in the present invention, an inclination of the movable body with respect to the fixed body is prevented.

In the present invention, for example, the first ball is fixed to the urging member, the second ball is fixed to the fixed body, and the turning axis part includes a first receiving part which is formed with a receiving face in a concave curved face shape contacted with the first ball and is attached to the movable body, and a second receiving part which is formed with a receiving face in a concave curved face shape contacted with the second ball and is attached to the movable body. In this case, the first ball is fixed to the urging member and the second ball is fixed to the fixed body and thus, for example, even when an impact is applied to an optical unit with a shake correction function due to dropping of the optical unit, displacement of each of the first ball and the second ball from a predetermined position can be prevented.

In the present invention, for example, the movable body is formed of resin material, each of the first ball and the second ball is formed of metal material, and each of the first receiving part and the second receiving part is formed of metal material. In this case, the first ball is contacted with the receiving face of the first receiving part made of metal and thus, even when the first ball made of metal slides on the receiving face of the first receiving part, wear of the receiving face of the first receiving part can be restrained. Further, in this case, the second ball is contacted with the receiving face of the second receiving part made of metal and thus, even when the second ball made of metal slides on the receiving face of the second receiving part, wear of the receiving face of the second receiving part can be restrained. In a case that the first ball and the second ball made of metal are directly contacted with the movable body made of resin, when the first ball and the second ball slide on the movable body, the movable body may be worn to increase a sliding resistance between the first ball and the movable body and increase a sliding resistance between the second ball and the movable body.

In the present invention, it is preferable that the turning axis part includes a receiving member structured of the first receiving part, the second receiving part, and a connecting part in a flat plate shape connecting the first receiving part and the second receiving part, and the movable body is formed with a first contact face in a flat face shape which is contacted with the connecting part, a second contact face which is contacted with the first receiving part, and a third contact face which is contacted with the second receiving part. According to this structure, when dimensional accuracy between the first contact face, the second contact face and the third contact face of the movable body is secured, the dimensional accuracy between the first receiving part and the second receiving part can be secured in a state that the receiving member is attached to the movable body. Therefore, the dimensional accuracy between the first receiving part and the second receiving part can be comparatively easily secured.

In the present invention, it may be structured that the first ball and the second ball are fixed to the movable body, the urging member is formed with a receiving face in a concave curved face shape which is contacted with the first ball, and the fixed body includes a receiving member formed with a receiving face in a concave curved face shape which is contacted with the second ball. Also in this case, the first ball and the second ball are fixed to the movable body and thus, for example, when an impact is applied to an optical unit with a shake correction function due to dropping of the optical unit, displacement of each of the first ball and the second ball from a predetermined position can be prevented.

Effects of the Invention

As described above, in the present invention, in an optical unit with a shake correction function including a reflection member formed with a reflection surface which reflects light entering from the outside, a movable body which turnably holds the reflection member, and a fixed body which turnably holds the movable body, the optical unit is capable of preventing an inclination of the movable body with respect to the fixed body.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is a perspective view showing a smart phone into which the optical unit with a shake correction function shown in FIG. 1 is incorporated.

FIG. 7 is an explanatory schematic view showing a configuration of a camera which is incorporated into the smart phone shown in FIG. 6.

DETAILED DESCRIPTION

An embodiment of the present invention will be described below with reference to the accompanying drawings.

(Entire Structure of Optical Unit With Shake Correction Function)

Figure 1:
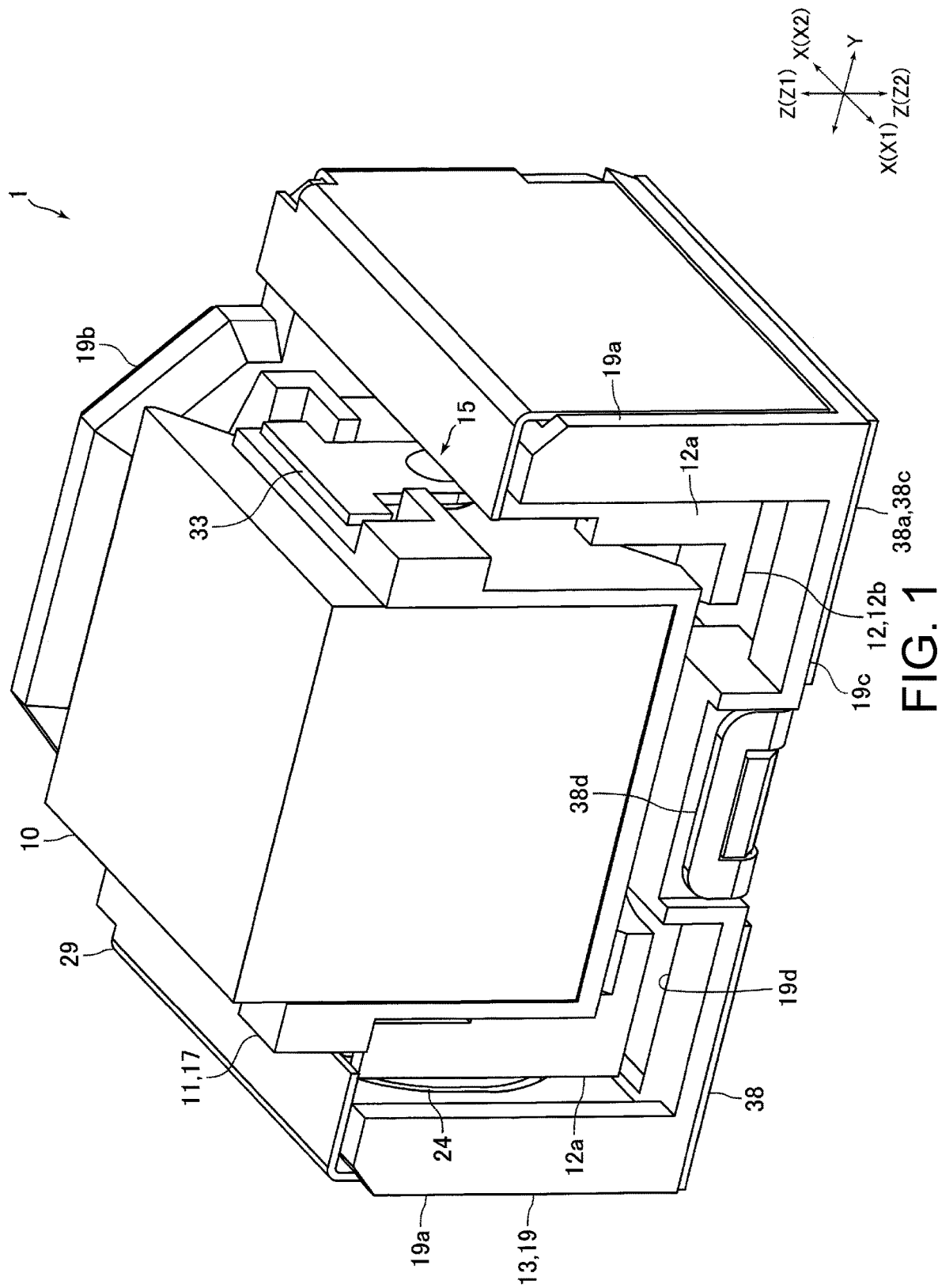
FIG. 1 is a perspective view showing an optical unit with a shake correction function in accordance with an embodiment of the present invention.
Figure 2:
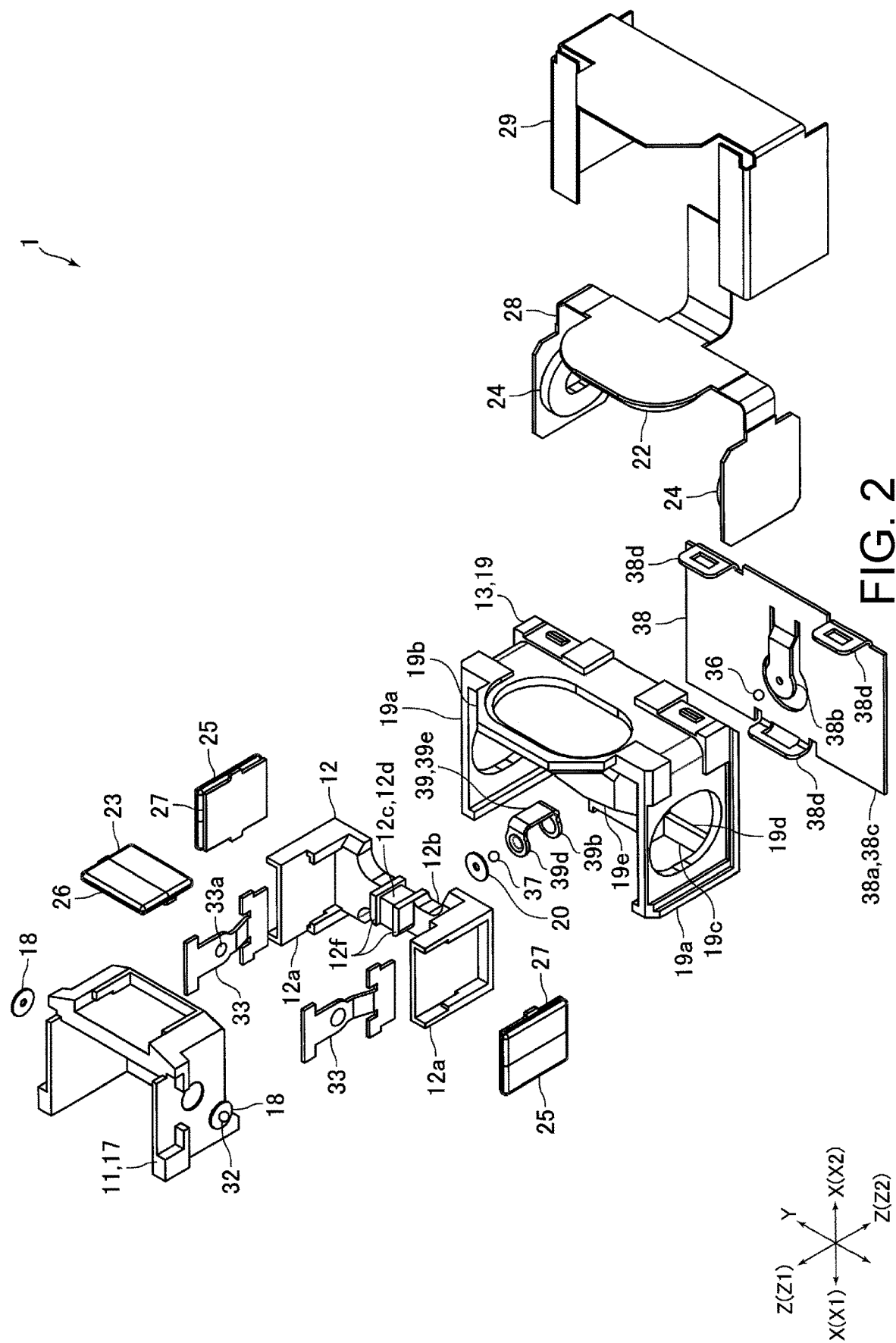
FIG. 2 is an exploded perspective view showing the optical unit with a shake correction function in FIG. 1.
Figure 3:
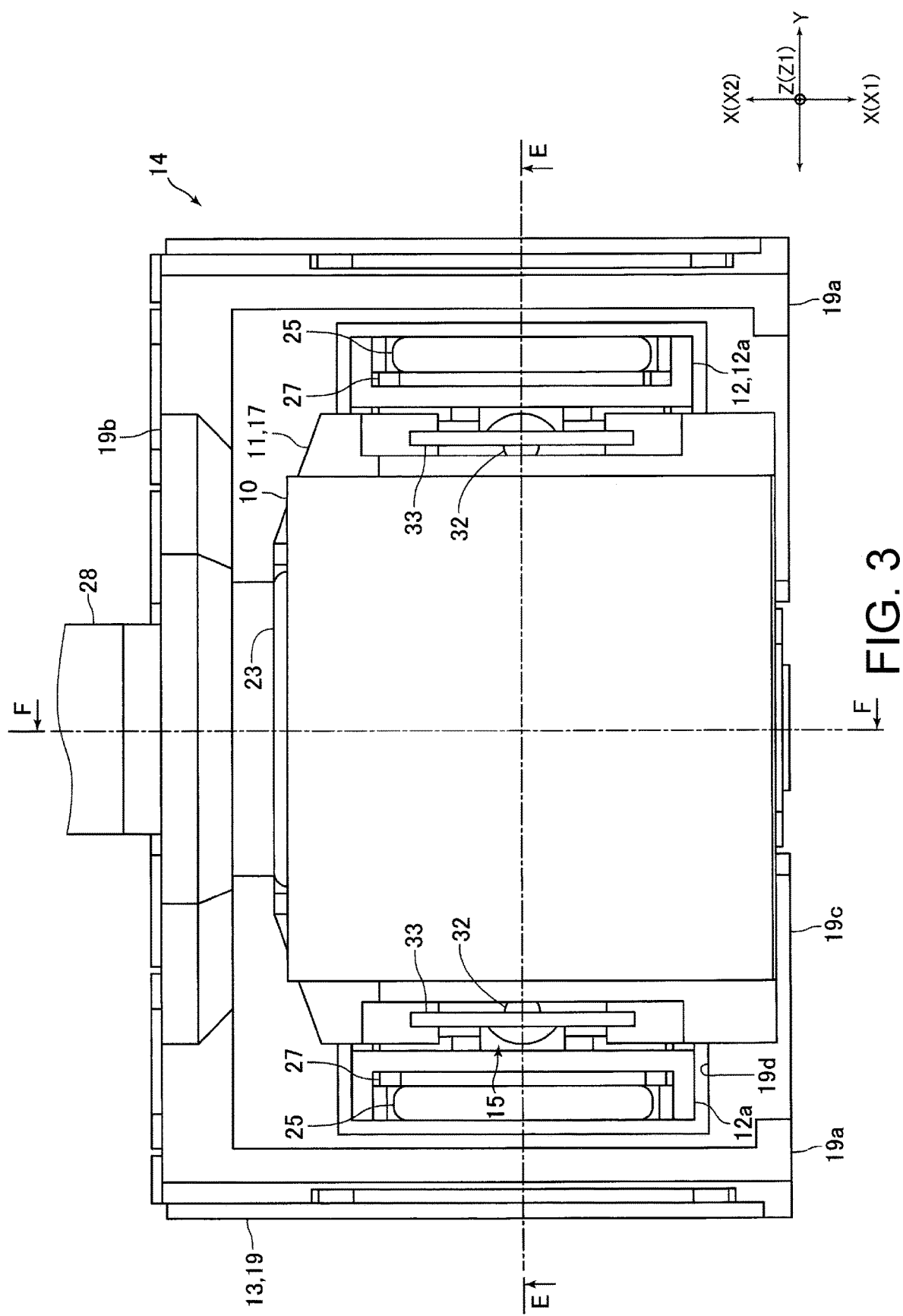
FIG. 3 is a plan view showing a state that a cover is detached from the optical unit with a shake correction function shown in FIG. 1.
Figure 4:
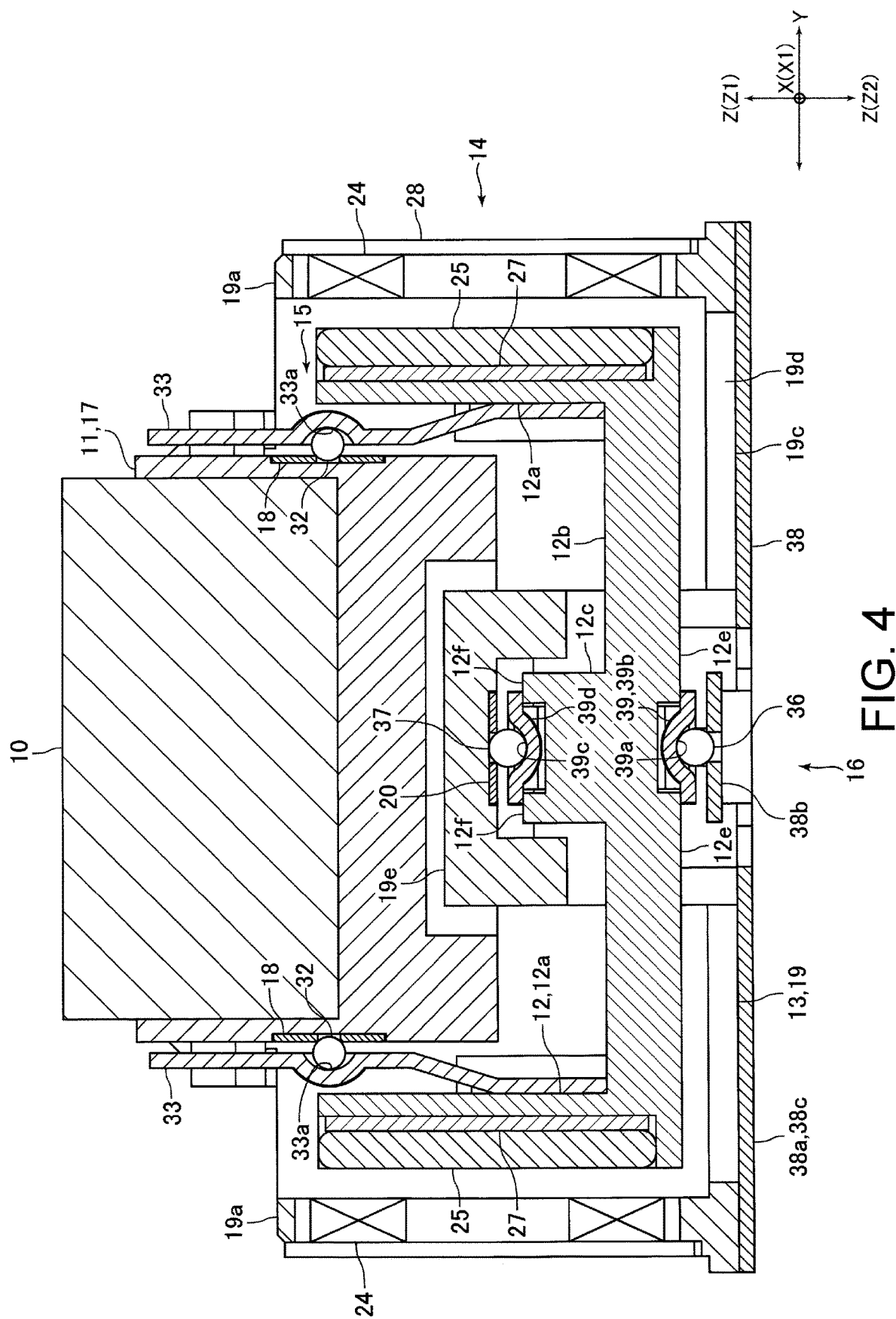
FIG. 4 is a cross-sectional view showing the "E-E" cross section in FIG. 3.
Figure 5:
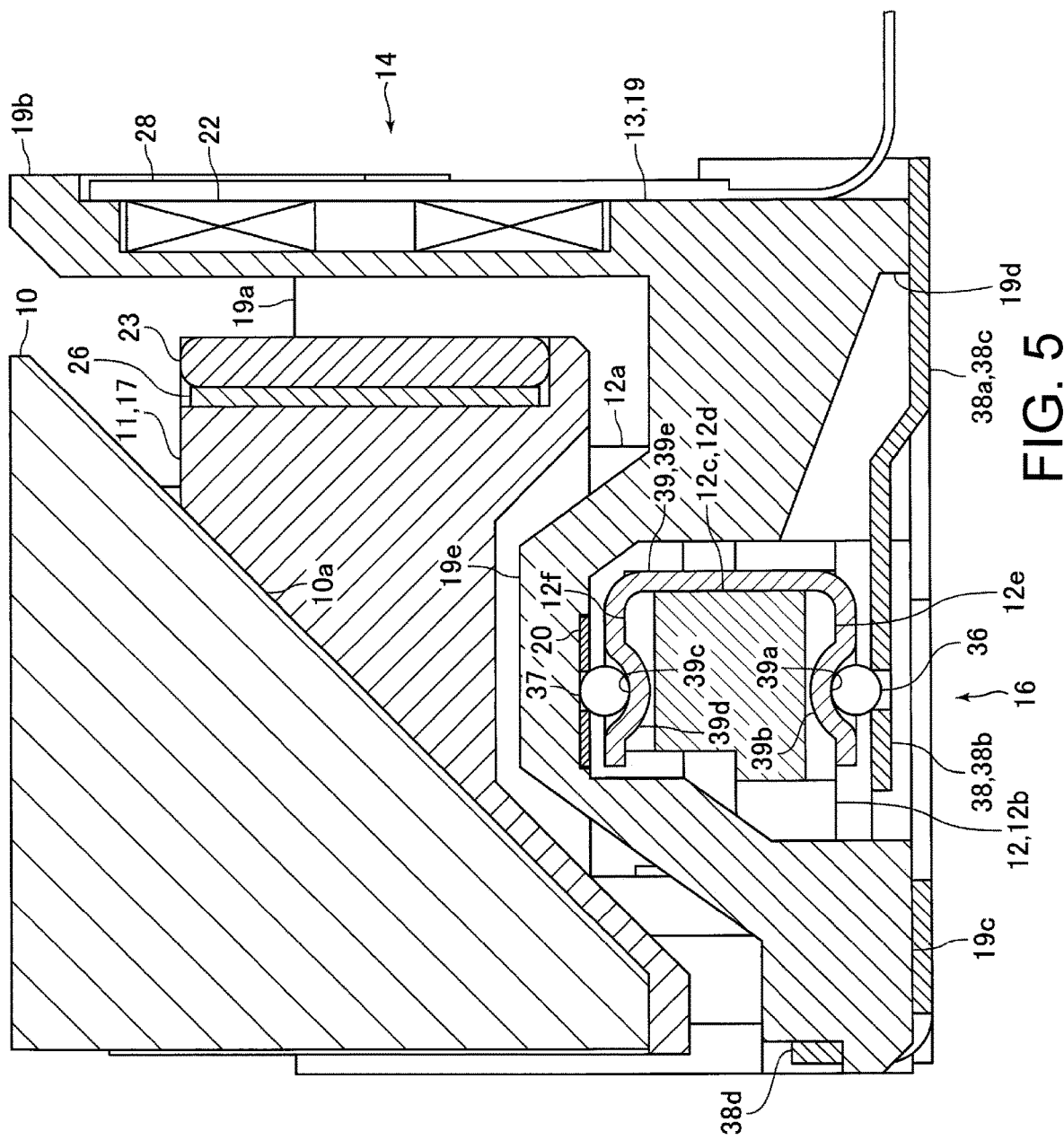
FIG. 5 is a cross-sectional view showing the "F-F" cross section in FIG. 3.

FIG. 1 is a perspective view showing an optical unit 1 with a shake correction function in accordance with an embodiment of the present invention. FIG. 2 is an exploded perspective view showing the optical unit 1 with a shake correction function in FIG. 1. FIG. 3 is a plan view showing a state that a cover 29 is detached from the optical unit 1 with a shake correction function shown in FIG. 1. FIG. 4 is a cross-sectional view showing the "E-E" cross section in FIG. 3. FIG. 5 is a cross-sectional view showing the "F-F" cross section in FIG. 3. FIG. 6 is a perspective view showing a smart phone 2 into which the optical unit 1 with a shake correction function shown in FIG. 1 is incorporated. FIG. 7 is an explanatory schematic view showing a configuration of a camera 3 which is incorporated into the smart phone 3 shown in FIG. 6.

An optical unit 1 with a shake correction function in this embodiment (hereinafter, referred to as an "optical unit 1") is provided with a shake correction function for correcting an optical image shake. The optical unit 1 is, for example, incorporated into a smart phone 2 (see FIG. 6). Further, the optical unit 1 structures a part of a camera 3 (see FIG. 7) incorporated into the smart phone 2. In accordance with an embodiment of the present invention, the optical unit 1 may be incorporated into a portable device other than the smart phone 2.

As shown in FIG. 7, the camera 3 includes a lens 4 on which light from the outside of the smart phone 2 is incident, and a substrate 6 on which an imaging element 5 is mounted. An optical axis "L1" of the lens 4 and a normal line "L2" passing through a center of an imaging face of the imaging element 5 is perpendicular to each other. In other words, the optical axis "L1" of the lens 4 and the imaging face of the imaging element 5 are parallel to each other. The optical unit 1 is disposed between the lens 4 and the imaging element 5 in an optical path directed from the lens 4 to the imaging element 5. A lens 7 is disposed between the optical unit 1 and the imaging element 5. An optical axis of the lens 7 is coincided with the normal line "L2".

The optical unit 1 includes a prism 10 as a reflection member which is formed with a reflection surface 10a reflecting light entering from the outside. The reflection surface 10a reflects light entering the reflection surface 10a through the lens 4 toward the imaging element 5. Further, the reflection surface 10a bends an optical axis of light entering the reflection surface 10a by substantially 90°. In FIG. 2, the prism 10 is not shown.

In the following descriptions, a direction of the optical axis "L1" of the lens 4 ("Z" direction in FIG. 1 and the like) is referred to as an upper and lower direction, a direction of the normal line "L2" with respect to the imaging face of the imaging element 5 ("X" direction in FIG. 1 and the like) is referred to as a front and rear direction, and the "Y" direction perpendicular to the upper and lower direction and the front and rear direction in FIG. 1 and the like is referred to as a right and left direction. Further, in the upper and lower direction, a side where the lens 4 is disposed with respect to the optical unit 1 (the "Z1" direction side in FIG. 1 and the like) is referred to as an "upper" side, and the "Z2" direction side in FIG. 1 and the like which is an opposite side to the "Z1" direction side is referred to as a "lower" side. Further, in the front and rear direction, a side where the imaging element 5 is disposed with respect to the optical unit 1 (the "X1" direction side in FIG. 1 and the like) is referred to as a "front" side, and the "X2" direction side in FIG. 1 and the like which is an opposite side to the "X1" direction side is referred to as a "rear" side.

The optical unit 1 includes, in addition to the prism 10, a holder 11 to which the prism 10 is fixed, a movable body 12 which turnably holds the prism 10 and the holder 11, a fixed body 13 which turnably holds the movable body 12, and a drive mechanism 14 structured to turn the prism 10 and the holder 11 with respect to the movable body 12 and turn the movable body 12 with respect to the fixed body 13. Further, the optical unit 1 includes a turning axis part 15 which structures a turning center of the prism 10 and the holder 11 with respect to the movable body 12, and a turning axis part 16 which structures a turning center of the movable body 12 with respect to the fixed body 13.

The movable body 12 is capable of turning with respect to the fixed body 13 with the upper and lower direction as an axial direction of turning. The upper and lower direction in this embodiment ("Z" direction) is a first direction. Further, the prism 10 and the holder 11 are capable of turning with respect to the movable body 12 with a direction perpendicular to the upper and lower direction as an axial direction of turning. The axial direction of turning of the prism 10 and the holder 11 with respect to the movable body 12 is varied according to a turning position of the movable body 12 with respect to the fixed body 13. However, the axial direction is coincided with a slightly inclined direction with respect to the right and left direction or coincided with the right and left direction. The optical unit 1 corrects an optical image shake by performing at least one of a turning operation of the movable body 12 with respect to the fixed body 13 and a turning operation of the prism 10 and the holder 11 with respect to the movable body 12.

The holder 11 is structured of a main body part 17 and two ball fixing plates 18 which are fixed to the main body part 17. The main body part 17 is formed of resin material, and the ball fixing plate 18 is formed of metal material such as a steel plate. The ball fixing plate 18 is formed in a flat plate shape. Further, the ball fixing plate 18 is formed in a circular plate shape. The ball fixing plate 18 is disposed so that a thickness direction of the ball fixing plate 18 and the right and left direction are substantially coincided with each other. The ball fixing plate 18 is fixed to the main body part 17 in a state that the ball fixing plate 18 is disposed in a recessed part which is formed on an outer side face of the main body part 17 in the right and left direction. Further, the ball fixing plate 18 is adhesively bonded and fixed to the main body part 17. The ball fixing plate 18 is fixed with a ball 32 described below which structures a part of the turning axis part 15. A center of the ball fixing plate 18 is formed with a through hole for stabilizing a fixed state of the ball 32.

The movable body 12 is formed of resin material. The movable body 12 is structured of two side face parts 12a structuring side faces in the right and left direction of the movable body 12 and a bottom face part 12b structuring a bottom face of the movable body 12. Lower ends of the two side face parts 12a are connected with both end parts in the right and left direction of the bottom face part 12b. A center part of the bottom face part 12b in the right and left direction is formed with an attaching part 12c to which a receiving member 39 described below structuring a part of the turning axis part 16 is attached. The holder 11 is disposed between the two side face parts 12a in the right and left direction. Further, the holder 11 is disposed on an upper side with respect to the bottom face part 12b.

The fixed body 13 is structured of a main body part 19 and a ball fixing plate 20 which is fixed to the main body part 19. The main body part 19 is formed of resin material, and the ball fixing plate 20 is formed of metal material such as a steel plate. The main body part 19 is provided with two side face parts 19a structuring side faces in the right and left direction of the fixed body 13, a rear face part 19b structuring a rear face of the fixed body 13, and a bottom face part 19c structuring a bottom face of the fixed body 13. The bottom face part 19c is formed with an opening part 19d in a rectangular shape which penetrates through the bottom face part 19c in the upper and lower direction.

The movable body 12 is disposed between the two side face parts 19a in the right and left direction. Further, the movable body 12 is disposed on a front side with respect to the rear face part 19b and is disposed on an upper side with respect to the bottom face part 19c. The main body part 19 is provided with a cover part 19e which covers the attaching part 12c of the movable body 12 from an upper side. The cover part 19e covers the opening part 19d from an upper side in a center part in the right and left direction of the main body part 19. When the movable body 12 is moved from a lower side with respect to the bottom face part 19c so that the movable body 12 is passed through the opening part 19d, the movable body 12 is disposed in a region which is defined by the two side face parts 19a and the rear face part 19b.

The ball fixing plate 20 is formed in a flat plate shape. Further, the ball fixing plate 20 is formed in a circular plate shape. The ball fixing plate 20 is disposed so that a thickness direction of the ball fixing plate 20 and the upper and lower direction are coincided with each other. The ball fixing plate 20 is fixed to the cover part 19e in a state that the ball fixing plate 20 is disposed in a recessed part formed on a lower face of the cover part 19e. Further, the ball fixing plate 20 is adhesively bonded and fixed to the cover part 19e. The ball fixing plate 20 is fixed with a ball 37 described below which structures a part of the turning axis part 16. A center of the ball fixing plate 20 is formed with a through hole for stabilizing a fixed state of the ball 37.

The drive mechanism 14 includes a drive coil 22 and a drive magnet 23 for turning the prism 10 and the holder 11 with respect to the movable body 12, and two drive coils 24 and two drive magnets 25 for turning the movable body 12 with respect to the fixed body 13. The drive magnet 23 is fixed to a rear face of the holder 11. The drive magnets 25 are fixed to outer side faces of the outer side face parts 12a in the right and left direction. A magnetic plate 26 formed of magnetic material is disposed between the drive magnet 23 and the holder 11, and a magnetic plate 27 formed of magnetic material is disposed between the drive magnet 25 and the side face part 12a.

The drive coil 22 is disposed on a rear side with respect to the drive magnet 23 and faces the drive magnet 23 in the front and rear direction. The drive coil 24 is disposed on an outer side with respect to the drive magnet 25 in the right and left direction and faces the drive magnet 25 in the right and left direction. The drive coils 22 and 24 are mounted on a flexible printed circuit board (FPC) 28. The FPC 28 is fixed to the main body part 19. In other words, the drive coils 22 and 24 are fixed to the main body part 19 through the FPC 28. The side face part 19a of the main body part 19 is formed with a through hole in which the drive coil 24 is disposed, and the rear face of the rear face part 19b is formed with a recessed part in which the drive coil 22 is disposed. The FPC 28 is covered from outer sides in the right and left direction, from the rear side and the upper side by the cover 29. The cover 29 is fixed to the main body part 19.

The turning axis part 15 includes two balls 32 in a spherical shape which are disposed on outer sides of the holder 11 in the right and left direction, and two plate springs 33 which urge the balls 32 toward inner sides in the right and left direction. The ball 32 and the plate spring 33 are formed of metal material such as a steel product. The ball 32 is welded and fixed to the ball fixing plate 18. In other words, the ball 32 is fixed to the holder 11. A part of the ball 32 is disposed in an inside of the through hole of the ball fixing plate 18.

A lower end part of the plate spring 33 is attached to an inner side face of the side face part 12a in the right and left direction. The plate spring 33 is formed with a receiving face 33a in a concave curved face shape with which the ball 32 is contacted (see FIG. 4). The two balls 32 are disposed at the same position as each other in the upper and lower direction. Further, the two balls 32 are disposed at the same position as each other in an axial direction of turning of the prism 10 and the holder 11 with respect to the movable body 12 and in a direction perpendicular to the upper and lower direction. The prism 10 and the holder 11 is capable of turning with respect to the movable body 12 with an axial line passing through centers of the two balls 32 as a turning center.

The turning axis part 16 includes a ball 36 in a spherical shape as a first ball which is disposed on a lower side of the movable body 12, a ball 37 in a spherical as a second ball which is disposed on an upper side of the movable body 12, and a plate spring 38 as an urging member which urges the ball 36 toward the ball 37 (in other words, urges the ball 36 toward an upper side). Next, a specific structure of the turning axis part 16 and a peripheral portion of the turning axis part 16 will be described below.

(Structure of Turning Axis Part and Peripheral Portion of Turning Axis Part)

As described above, the turning axis part 16 includes the balls 36 and 37 and the plate spring 38. The plate spring 38 is formed of metal material such as of a steel plate. The plate spring 38 is structured of an attached part 38a, which is attached to a lower face side of the main body part 19, and a spring part 38b which urges the ball 36. The attached part 38a is structured of a flat plate part 38c in a flat plate shape contacting with a lower face of the bottom face part 19c of the main body part 19 and engaging parts 38d engaged with engagement pieces of the main body part 19. The spring part 38b is disposed in a center part of the plate spring 38. Further, the spring part 38b is disposed on a lower side with respect to the cover part 19e. A rear end of the spring part 38b is connected with the flat plate part 38c, and the spring part 38b is elastically deformable in the upper and lower direction.

The balls 36 and 37 are formed of metal material such as a steel product. The ball 36 and the ball 37 are formed in the same shape as each other. As described above, the ball 36 is disposed on a lower side of the movable body 12, and the ball 37 is disposed on an upper side of the movable body 12. Specifically, the ball 36 is disposed on a lower side of the attaching part 12c, and the ball 37 is disposed on an upper side of the attaching part 12c.

The ball 36 is fixed to the spring part 38b. In other words, the ball 36 is fixed to the plate spring 38. Specifically, the ball 36 is welded and fixed to an upper face side of the spring part 38b. The spring part 38b is formed with a through hole for stabilizing a fixed state of the ball 36, and a lower end part of the ball 36 is disposed in an inside of the through hole. The ball 37 is fixed in the ball fixing plate 20. Specifically, the ball 37 is welded and fixed to a lower face side of the ball fixing plate 20. In other words, the ball 37 is fixed to the fixed body 13 and is contacted with the fixed body 13. An upper end part of the ball 37 is disposed in an inside of the through hole formed at a center of the ball fixing plate 20.

The turning axis part 16 includes a receiving member 39 which is attached to the movable body 12. The receiving member 39 is structured of a receiving part 39b as a first receiving part formed with a receiving face 39a in a concave curved face shape which is contacted with the ball 36, a receiving part 39d as a second receiving part formed with a receiving face 39c in a concave curved face shape which is contacted with the ball 37, and a connecting part 39e in a flat plate shape which connects the receiving part 39b with the receiving part 39d. In other words, the turning axis part 16 is provided with the receiving parts 39b and 39d and the connecting part 39e.

The receiving member 39 is formed of metal material such as a steel plate. In other words, the receiving parts 39b and 39d and the connecting part 39e are formed of metal material. Further, the receiving member 39 is formed by bending a metal plate in a predetermined shape. The connecting part 39e is formed in a rectangular flat plate shape and is disposed so that a thickness direction of the connecting part 39e and the front and rear direction are coincided with each other. The receiving part 39b is extended from a lower end of the connecting part 39e toward a front side. The receiving part 39d is extended from an upper end of the connecting part 39e toward a front side. In other words, the receiving member 39 is formed in a rectangular groove shape (U-shape). The receiving face 39a is recessed from a lower face of the receiving part 39b toward an upper side. The receiving face 39c is recessed from an upper face of the receiving part 39d toward a lower side.

The receiving member 39 is attached to the attaching part 12c of the movable body 12 from a rear side. Further, the receiving member 39 is attached to the attaching part 12c by utilizing a spring property of the receiving member 39. The attaching part 12c is formed with a contact face 12d in a flat face shape as a first contact face with which the connecting part 39e is contacted. The contact face 12d is formed on a rear face of the attaching part 12c, and the contact face 12d is contacted with a front face of the connecting part 39e.

Further, the attaching part 12c is formed with a contact face 12e in a flat face shape as a second contact face with which the receiving part 39b is contacted. Specifically, a lower face of the attaching part 12c is formed with a recessed part for disposing a portion of the receiving part 39b where the receiving face 39a is formed, and both side portions in the right and left direction with respect to the recessed part are formed as the contact face 12e. The contact face 12e is contacted with an upper face of the receiving part 39b. Specifically, both end parts in the right and left direction of an upper face of the receiving part 39b are contacted with the contact face 12e.

Further, the attaching part 12c is formed with a contact face 12f in a flat face shape as a third contact face with which the receiving part 39d is contacted. Specifically, an upper face of the attaching part 12c is formed with a recessed part for disposing a portion of the receiving part 39d where the receiving face 39c is formed, and both side portions in the right and left direction with respect to the recessed part are formed as the contact face 12f. The contact face 12f is contacted with a lower face of the receiving part 39d. Specifically, both end parts in the right and left direction of a lower face of the receiving part 39d are contacted with the contact face 12f.

The ball 36 and the ball 37 are disposed at the same position as each other in the front and rear direction and in the right and left direction. Further, the receiving face 39a and the receiving face 39c are disposed at the same position as each other in the front and rear direction and in the right and left direction. The movable body 12 is capable of turning with respect to the fixed body 13 with an axial line passing a center of the ball 36 and a center of the ball 37 as a turning center.

(Principal Effects in This Embodiment)

As described above, in this embodiment, the turning axis part 16 which structures a turning center of the movable body 12 with respect to the fixed body 13 includes the ball 36 disposed on a lower side of the movable body 12, the ball 37 which is disposed on an upper side of the movable body 12 and is fixed to the fixed body 13, and the plate spring 38 which urges the ball 36 toward the ball 37. Therefore, in this embodiment, a gap space is not formed in the turning axis part 16 in a radial direction of the turning axis part 16 which is perpendicular to the upper and lower direction. Therefore, according to this embodiment, an inclination of the movable body 12 with respect to the fixed body 13 can be prevented.

Further, in this embodiment, the ball 36 disposed on a lower side of the movable body 12 is urged by the plate spring 38 toward the ball 37 which is disposed on an upper side of the movable body 12 and is fixed to the fixed body 13. Therefore, for example, even when an impact is applied to the optical unit 1 due to dropping or the like of a smart phone 2, positional displacement of the turning axis part 16 in the upper and lower direction can be prevented.

In this embodiment, the ball 36 is fixed to the plate spring 38, and the ball 37 is fixed to the fixed body 13. Therefore, according to this embodiment, for example, even when an impact is applied to the optical unit 1 due to dropping or the like of a smart phone 2, positional displacement of the balls 36 and 37 can be prevented.

In this embodiment, the ball 36 made of metal is contacted with the receiving face 39a of the receiving part 39b made of metal, and the ball 37 made of metal is contacted with the receiving face 39c of the receiving part 39d made of metal. Therefore, according to this embodiment, even when the ball 36 slides on the receiving face 39a, wear of the receiving face 39a can be restrained and, even when the ball 37 slides on the receiving face 39c, wear of the receiving face 39c can be restrained.

In this embodiment, the receiving member 39 is formed in a rectangular groove shape which is provided with the receiving parts 39b and 39d and the connecting part 39e.

Further, in this embodiment, the movable body 12 is formed with the contact face 12d which is contacted with the connecting part 39e, the contact face 12e which is contacted with the receiving part 39b, and the contact face 12f which is contacted with the receiving part 39d. Therefore, according to this embodiment, when dimensional accuracy between the contact face 12d, the contact face 12e and the contact face 12f of the movable body 12 is secured, the dimensional accuracy between the receiving part 39b and the receiving part 39d can be secured in a state that the receiving member 39 is attached to the movable body 12. Accordingly, in this embodiment, dimensional accuracy between the receiving part 39b and the receiving part 39d can be comparatively easily secured.

(Other Embodiments)

Although the present invention has been shown and described with reference to a specific embodiment, various changes and modifications will be apparent to those skilled in the art from the teachings herein.

In the embodiment described above, the receiving part 39b and the receiving part 39d are connected with each other through the connecting part 39e. However, the receiving part 39b and the receiving part 39d may be separately formed from each other. In this case, each of the receiving parts 39b and 39d separately formed from each other is fixed to the attaching part 12c of the movable body 12. Further, in the embodiment described above, the turning axis part 16 is not required to include the receiving member 39. In this case, the balls 36 and 37 are directly contacted with the attaching part 12c.

In the embodiment described above, the fixed body 13 is not required to include the ball fixing plate 20. In this case, the ball 37 is adhesively bonded and directly fixed to the cover part 19e. However, like the embodiment described above, when the ball 37 is welded and fixed to the ball fixing plate 20 formed with the through hole and, in addition, the ball fixing plate 20 is adhesively bonded and fixed to the main body part 19, fixed strength of the ball 37 to the fixed body 13 is increased. Further, in the embodiment described above, the ball 36 is not required to be fixed to the plate spring 38. Further, the ball 37 is not required to be fixed to the fixed body 13.

Figure 8:
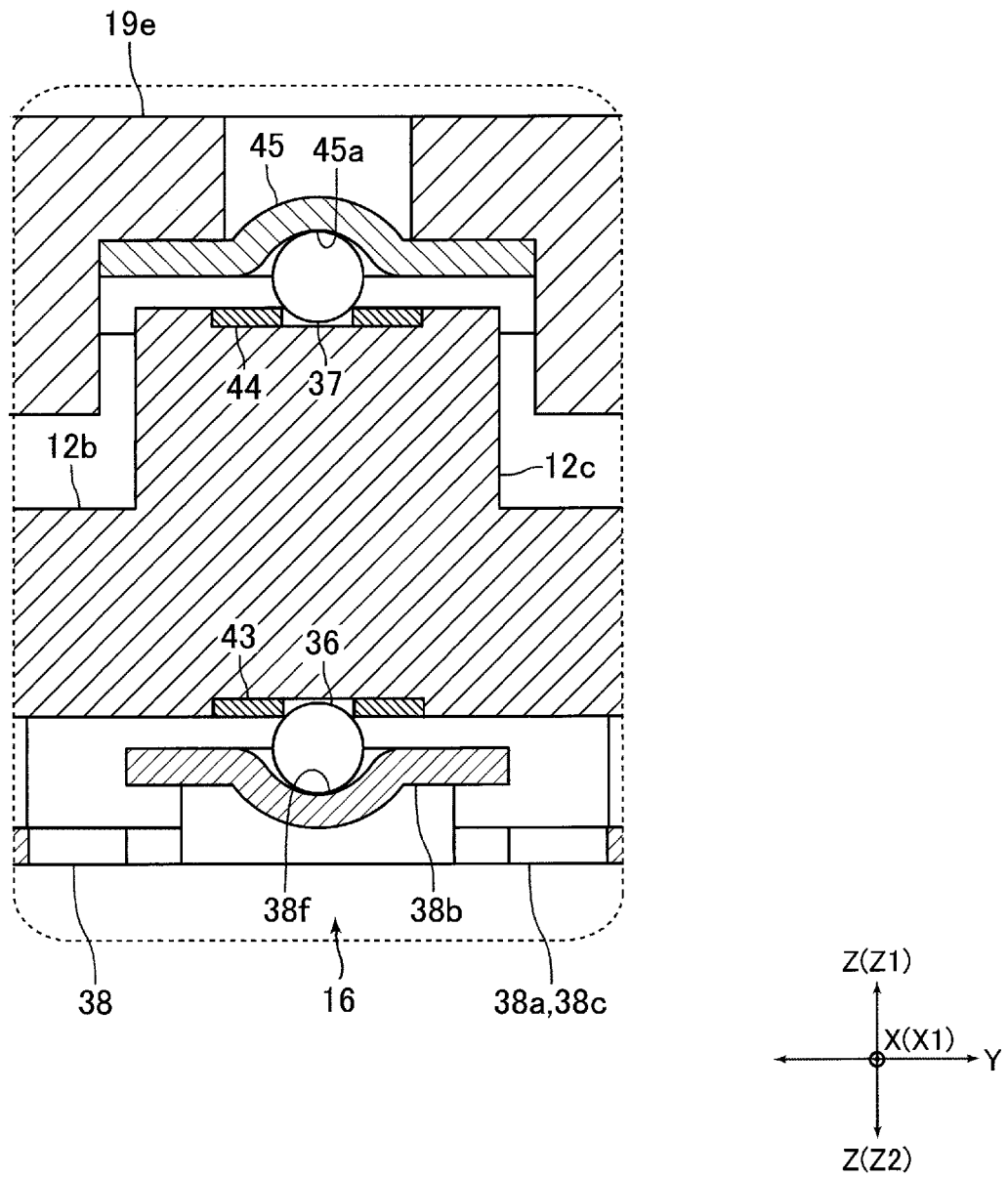
FIG. 8 is an explanatory enlarged cross-sectional view showing a structure of a turning axis part in accordance with another embodiment of the present invention.

In the embodiment described above, at least one of the ball 36 and the ball 37 may be fixed to the movable body 12. For example, both of the balls 36 and 37 may be fixed to the movable body 12. In this case, the turning axis part 16 does not include the receiving member 39. Further, in this case, for example, as shown in FIG. 8, the movable body 12 includes a ball fixing plate 43 to which a ball 36 is welded and fixed, and a ball fixing plate 44 to which a ball 37 is welded and fixed. The ball fixing plate 43 is adhesively bonded and fixed to the attaching part 12c in a state that the ball fixing plate 43 is disposed in an inside of a recessed part formed on a lower face of the attaching part 12c, and the ball fixing plate 44 is adhesively bonded and fixed to the attaching part 12c in a state that the ball fixing plate 44 is disposed in an inside of a recessed part formed on an upper face of the attaching part 12c Further, in this case, the spring part 38b of the plate spring 38 is formed with a receiving face 38f in a concave curved face shape which is contacted with the ball 36. The receiving face 38f is recessed from an upper face of the spring part 38b to a lower side. Further, the fixed body 13 includes, instead of the ball fixing plate 20, a receiving member 45 formed with a receiving face 45a in a concave curved face shape which is contacted with the ball 37. The receiving member 45 is formed of metal material such as a steel plate and is fixed to a lower face of the cover part 19e. The cover part 19e is formed with a through hole so as to penetrate through the cover part 19e in the upper and lower direction for disposing a portion of the receiving member 45 where the receiving face 45a is formed.

Also in a modified embodiment shown in FIG. 8, for example, when an impact is applied to the optical unit 1 due to dropping or the like of a smart phone 2, positional displacement of the balls 36 and 37 can be prevented. In the modified embodiment shown in FIG. 8, the balls 36 and 37 may be adhesively bonded and directly fixed to the movable body 12. Further, in this modified embodiment, the fixed body 13 may include no receiving member 45. In this case, the ball 37 is directly contacted with a lower face of the cover part 19e.

In the embodiment described above, the optical unit 1 may include, instead of the prism 10, a reflection mirror formed with a reflection surface which reflects light entering from the outside. Further, in the embodiment described above, the urging member which urges the ball 36 toward the ball 37 may be a spring member such as a compression coil spring other than the plate spring 38. In addition, in the embodiment described above, the movable body 12 may be provided with a spring part corresponding to the plate spring 33. In this case, the plate spring 33 is not required. Further, in the embodiment described above, an axial direction of turning of the movable body 12 with respect to the fixed body 13 and an axial direction of turning of the prism 10 and the holder 11 with respect to the movable body 12 are not required to be perpendicular to each other.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function comprising:
    a reflection member formed with a reflection surface which reflects light entering from outside;
    a movable body which turnably holds the reflection member;
    a fixed body which turnably holds the movable body;
    a drive mechanism structured to turn the reflection member with respect to the movable body and turn the movable body with respect to the fixed body; and
    a turning axis part which structures a turning center of the movable body with respect to the fixed body;
    wherein the movable body is capable of turning with respect to the fixed body with a first direction previously determined as an axial direction of turning; and
    wherein the turning axis part comprises:
        a first ball in a spherical shape which is disposed on one side of the movable body in the first direction;
        a second ball in a spherical shape which is disposed on an other side of the movable body in the first direction and is contacted with the fixed body; and
        an urging member which urges the first ball toward the second ball.

2. The optical unit with a shake correction function according to claim 1, wherein
    the first ball is fixed to the urging member,
    the second ball is fixed to the fixed body, and
    the turning axis part comprises:
        a first receiving part which is formed with a receiving face in a concave curved face shape contacted with the first ball and is attached to the movable body; and
        a second receiving part which is formed with a receiving face in a concave curved face shape contacted with the second ball and is attached to the movable body.

3. The optical unit with a shake correction function according to claim 2, wherein
    the movable body is formed of resin material,
    each of the first ball and the second ball is formed of metal material, and
    each of the first receiving part and the second receiving part is formed of metal material.

4. The optical unit with a shake correction function according to claim 3, wherein
    the turning axis part comprises a receiving member structured of the first receiving part, the second receiving part, and a connecting part in a flat plate shape connecting the first receiving part and the second receiving part, and
    the movable body is formed with:
        a first contact face in a flat face shape which is contacted with the connecting part;
        a second contact face which is contacted with the first receiving part; and
        a third contact face which is contacted with the second receiving part.

5. The optical unit with a shake correction function according to claim 2, wherein
    the turning axis part comprises a receiving member structured of the first receiving part, the second receiving part, and a connecting part in a flat plate shape connecting the first receiving part and the second receiving part, and
    the movable body is formed with:
        a first contact face in a flat face shape which is contacted with the connecting part;
        a second contact face which is contacted with the first receiving part; and
        a third contact face which is contacted with the second receiving part.

6. The optical unit with a shake correction function according to claim 1, wherein
    the first ball and the second ball are fixed to the movable body,
    the urging member is formed with a receiving face in a concave curved face shape which is contacted with the first ball, and
    the fixed body comprises a receiving member formed with a receiving face in a concave curved face shape which is contacted with the second ball.

* * * * *